US 8,154,449 B2

(12) United States Patent  
Yu et al.

(10) Patent No.: US 8,154,449 B2  
(45) Date of Patent: Apr. 10, 2012

(54) SIGNAL ACQUISITION SYSTEMS WITH APPLICATIONS OF GENERAL CLOCKS

(75) Inventors: Xiaoguang Yu, Wuhan (CN); Yishao Max Huang, Santa Clara, CA (US); Haiquan Huang, Chengdu (CN)

(73) Assignee: O2Micro International, Ltd., Georgetown (KY)

( * ) Notice: Subject to any disclaimer, the term of this patent is extended or adjusted under 35 U.S.C. 154(b) by 307 days.

(21) Appl. No.: 12/541,518

(22) Filed: Aug. 14, 2009

(65) Prior Publication Data  
US 2010/0039322 A1 Feb. 18, 2010

Related U.S. Application Data

(60) Provisional application No. 61/189,426, filed on Aug. 18, 2008.

(51) Int. Cl.  
G01S 19/36 (2010.01)  
G01S 19/24 (2010.01)

(52) U.S. Cl. ............... 342/357.76; 342/357.63

(58) Field of Classification Search ............ 342/357.46, 342/357.47, 357.65, 357.75, 357.76; 701/213, 701/215  
See application file for complete search history.

(56) References Cited

U.S. PATENT DOCUMENTS

| | | | |
|---|---|---|---|
| 6,985,811 B2 * | 1/2006 | Gronemeyer | 701/213 |
| 7,064,709 B1 | 6/2006 | Weisenburger et al. | |
| 7,500,125 B2 * | 3/2009 | Yasumoto | 713/322 |
| 7,551,129 B2 * | 6/2009 | Farmer | 342/357.42 |
| 2003/0227963 A1 | 12/2003 | Dafesh | |
| 2006/0274821 A1 | 12/2006 | Chen et al. | |
| 2008/0002797 A1 | 1/2008 | Raman et al. | |
| 2008/0303713 A1 | 12/2008 | Han | |
| 2010/0073230 A1 * | 3/2010 | Yu et al. | 342/357.12 |

FOREIGN PATENT DOCUMENTS

WO 2009108915 A2 9/2009

* cited by examiner

Primary Examiner — Dao Phan  
(74) Attorney, Agent, or Firm — Li K. Wang; Wang Law Firm, Inc.

(57) ABSTRACT

A global positioning system (GPS) system includes a clock module for providing multiple counter values at multiple time points. The GPS system also includes a system module coupled to the clock module. The system module is capable of obtaining a time value for each time point according to a set of signals from a signal source. The system module is further capable of calculating a set of parameters based on the counter values and the time value for each time point, and determining an estimated time value based on the parameters and a present counter value from the clock module.

22 Claims, 4 Drawing Sheets

SIGNAL ACQUISITION SYSTEMS WITH APPLICATIONS OF GENERAL CLOCKS

RELATED APPLICATION

This application claims priority to U.S. Provisional Application No. 61/189,426, filed on Aug. 18, 2008, which is hereby incorporated by reference in its entirety.

TECHNICAL FIELD

The present invention generally relates to radio communication and more specifically relates to system and method for signal acquisition in radio communication.

BACKGROUND

Global positioning system (GPS) is well known as an advanced technology that can be use to determine a location of an object on or above the earth. In conventional GPS systems, GPS receivers are attached to objects to track GPS signals and demodulate the GPS signals into GPS navigation messages which can include the satellite clock error, ephemeris, almanac for each satellite in the constellation, and the information about coordinated universal time, etc., and to determine the location of the objects based on the demodulated navigation messages. In addition, the GPS receiver also calculates the GPS time at which the GPS receiver receives the GPS signals according to the demodulated navigation messages. Usually, before tracking and demodulating a GPS signal, the GPS receiver needs to acquire the GPS signal. Thus, the GPS receiver may first need to determine a boundary of a navigation data bit in the GPS signal, e.g., a conventional navigation data bit that is 20 ms long, and then acquire the GPS signal based on a coherent integration process.

When the GPS receiver is powered off, a real time clock (RTC) can be used to provide a local time of the receiver. However, when the GPS receiver is re-powered on after being powered off for a time interval, the local time from the RTC may not be accurate enough to be used to determine the boundary of the navigation data bit in the GPS signal. Thus, the GPS receiver may need to operate the conventional GPS bit synchronization process to determine the boundary of the navigation data bit, which may take a relatively long time.

SUMMARY

The present invention provides a global positioning system (GPS) system that includes a clock module for providing multiple counter values at multiple time points. The GPS system also includes a system module coupled to the clock module. The system module is capable of obtaining a time value for each time point according to a set of signals from a signal source. The system module is further capable of calculating a set of parameters based on the counter values and the time value for each time point, and determining an estimated time value based on the parameters and a present counter value from the clock module.

The present invention also provides a method for acquiring a present signal. The method for acquiring the present signal includes providing multiple counter values by a counter at multiple time points, obtaining a time value for each time point according to a set of acquired signals, calculating a set of parameters by a system module based on the counter values and the time value for each time point, and determining an estimated time value based on the parameters and a present counter value from the counter.

The present invention also provides a GPS system that includes a signal receiver for receiving a set of signals. The GPS system also includes a system module coupled to the signal receiver. The system module is capable of obtaining multiple time values based on the set of signals, calculating a set of parameters based on the time values and multiple counter values, and acquiring a present signal received by the signal receiver based on the parameters and a present counter value. The GPS system further includes a counter coupled to the system module and for providing the multiple counter values and the present counter value.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a signal acquisition system. The signal acquisition system can be, but is not limited to, a GPS (global positioning system) receiver for acquiring GPS signals from satellites. The GPS receiver includes a counter for providing a set of counter values, and a system module capable of calculating an estimated/corrected time value based on the counter values, so as to acquire the GPS signals.

When the GPS receiver is operating, an acquiring process of the GPS signals and a calculating process of GPS times are performed interactively with each other. For example, after acquiring GPS signals from one or more satellites, the GPS receiver can calculate a current GPS time according to the navigation messages demodulated from the GPS signals. The navigation messages include the information of the satellite clock error, ephemeris, almanac for each satellite in the constellation, and the information about coordinated universal time, etc. In return, based on the current GPS time, the GPS receiver can determine boundaries of navigation data bits in currently received GPS signals, so as to continue acquiring GPS signals from the satellites.

Advantageously, when the GPS receiver is powered off, the counter continues generating counter values. When the GPS receiver is re-powered on, the system module calculates an estimated time value according to a counter value from the counter. Based on the estimated time value, the system module can determine bit boundaries of the navigation data bits, and so as to acquire and track the GPS signals. As a result, the time to first fix (TTFF) of the GPS receiver, which indicates the time delay from the time when the GPS receiver is powered on to the time when the GPS receiver determines a current position of the GPS receiver, can decrease.

Figure 1:
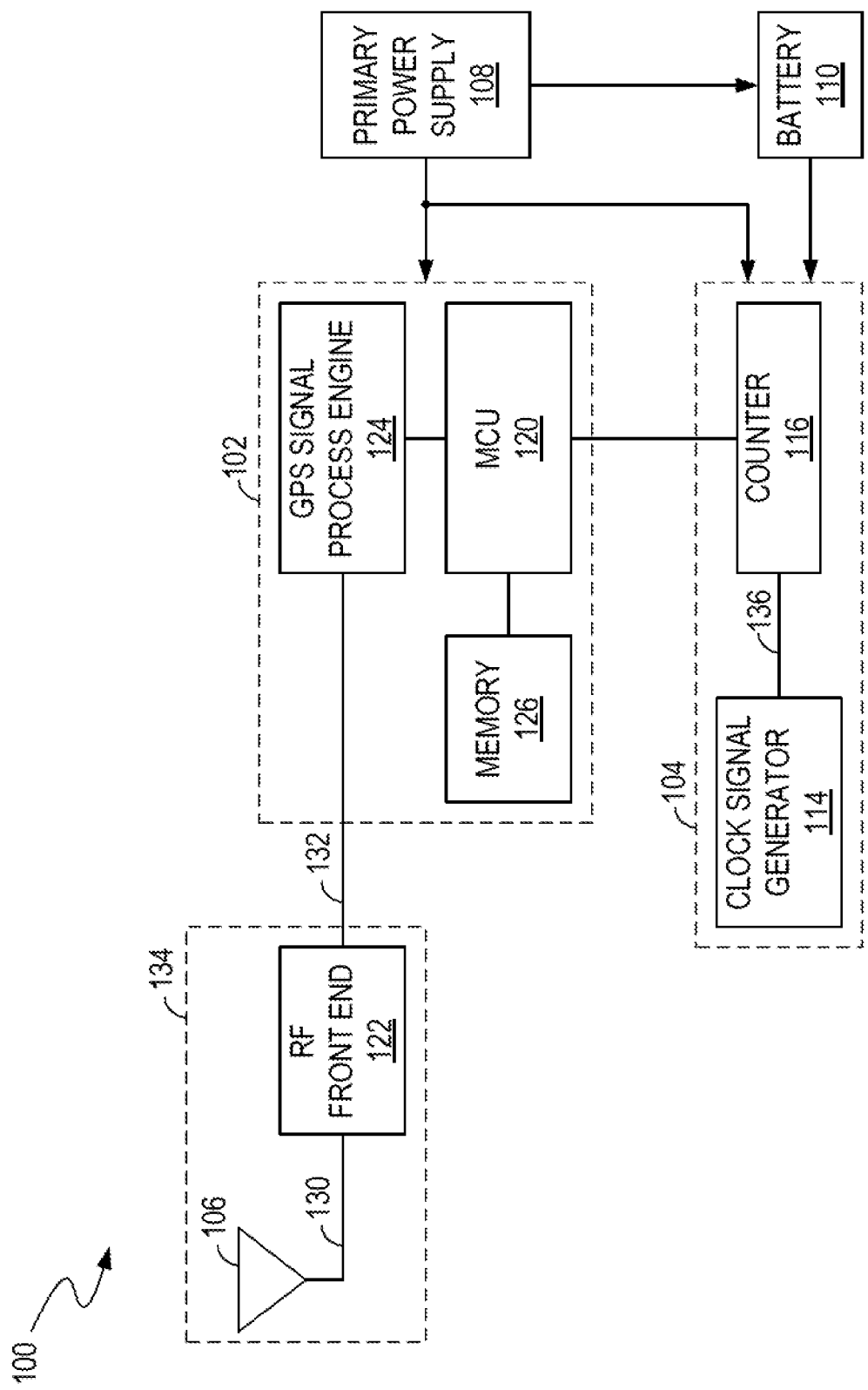
FIG. 1 depicts a block diagram example of a signal acquisition system, in accordance with one embodiment of the present invention.

FIG. 1 depicts a block diagram example of a signal acquisition system 100, in accordance with one embodiment of the present invention. The signal acquisition system 100 can be, but is not limited to, a GPS receiver. The GPS receiver 100 can include a clock module 104, a system module 102, and a signal receiver 134.

As shown in FIG. 1, the signal receiver 134 includes an antenna 106 for receiving GPS signals from a signal source, e.g., one or more satellites (not shown in FIG. 1). The signal receiver 134 further includes a radio frequency (RF) front end 122 for amplifying the input signal 130 received via the antenna 106 to a proper amplitude and converting the frequency of the input signal 130 to a desired output frequency. The output signal 132 is transferred from the RF front end 122 to the system module 102. The dock module 104 includes a counter 116 for providing counter values C, and a clock signal generator 114 (e.g., a crystal oscillator) for providing a clock signal 136 to drive the counter 116. For example, the counter value C of the counter 116 increases by 1 in response to each clock pulse of the clock signal 136. The system module 102 coupled to the clock module 104 is capable of calculating an estimated/corrected time value T' based on the counter values C. Thus, if the GPS receiver 100 is re-powered on after being powered off for a time interval, the system module 102 can determine navigation data bit boundaries in currently received GPS signals based on the estimated time value T, so as to re-acquire the GPS signals.

Specifically, in one embodiment, the system module 102 includes a GPS signal process engine 124, a MCU (micro control unit) 120 or a CPU (central process unit) coupled to the GPS signal process engine 124, and a memory 126 coupled to the MCU 120. The system module 102 can acquire, track and demodulate the GPS signals by using the GPS signal process engine 124, the MCU 120, and the memory 126.

In operation, when the GPS receiver 100 is powered by a primary power supply 108, the GPS signal processing engine 124 can acquire GPS signals and demodulate the GPS signals into navigation messages. The MCU 120 can calculate the GPS time value T according to the navigation messages and determine the navigation data bit boundaries in the later received GPS signals according to the GPS time value T. Thus, the GPS signal process engine 124 can keep acquiring, tracking and demodulating GPS signals. Meanwhile, the clock module 104 can increase the counter value C by 1 in response to each clock pulse of the clock signal 136. A relationship between the GPS time value T for a time point and the counter value C generated at the time point can be determined. Advantageously, when the GPS receiver 100 is powered off, the clock module 104 can be powered by a battery 110, and the counter 116 can continue operating. When the GPS receiver 100 is re-powered on after being powered off for a time interval, the GPS receiver 100 may need to re-acquire and re-track GPS signals from the satellites. Based on the determined relationship between the GPS time value T and the counter value C, the MCU 120 can calculate an estimated time value T' according to a present counter value C provided by the counter 116. The GPS receiver 100 can determine the navigation data bit boundaries in the GPS signals according to the estimated time value T'. Thus, the GPS receiver 100 can acquire, track and demodulate the GPS signals.

More specifically, when the GPS receiver 100 is operating, e.g., when the GPS receiver 100 is acquiring, tracking, and demodulating GPS signals properly, the counter 116 can provide multiple counter values $C_1, C_2, C_3, \ldots C_m$ at multiple GPS time points $T_1, T_2, T_3, \ldots T_m$ (m is a finite positive integer). The MCU 120 can obtain/calculate a time value for each GPS time point $T_1$-$T_m$ according to a set of acquired GPS signals. Each counter value $C_1$ corresponds to a time value at the GPS time point $T_i$ (i=1, 2, ... m). The memory 126 can store the corresponding data pairs $(T_i, C_i)$ (i=1, 2, ... m).

In one embodiment, a relationship between a time value T(C) for each GPS time point $T_1$-$T_m$ and a corresponding counter value $C_1$-$C_m$ is described by a polynomial equation (1).

$$T(C) = \sum_{k=0}^{\infty} A_k \times C^k, \tag{1}$$

where the parameters/coefficients $A_k$ (k=0, 1, 2. . . ) can be obtained by mathematical algorithms, e.g., polynomial-fitting method, least-squares procedure, etc. According to equation (1), the time value T(C) can be approximately equal to $$\sum_{k=0}^{n} A_k \times C^k$$

if the integer n is sufficiently large. For example, equation (1) is rewritten as:

$$T(C) \approx \sum_{k=0}^{n} A_k \times C^k = A_0 + A_1 \times C + A_2 \times C^2 \ldots + A_n \times C^n, \tag{2}$$

The MCU 120 can select n+1 pairs of data $(T_i, C_i)$ from the memory 126, e.g., the counter values $C_1$-$C_{n+1}$ and time values for the time points $T_1$-$T_{n+1}$, such that n+1 equations can be obtained:

$$T_1 = A_0 + A_1 \times C_1 + A_2 \times C_1^2 \ldots + A_n \times C_1^n; \tag{2\_1}$$

$$T_2 = A_0 + A_1 \times C_2 + A_2 \times C_2^2 \ldots + A_n \times C_2^n; \tag{2\_2}$$

$$\ldots$$

$$T_{n+1} = A_0 + A_1 \times C_{n+1} + A_2 \times C_{n+1}^2 \ldots + A_n \times C_{n+1}^n. \tag{2\_\_n+1}$$

Thus, the MCU 120 can calculate the parameters $A_0$-$A_n$ based on the counter values $C_1$-$C_{n+1}$ and the time value for each time point $T_1$-$T_{n+1}$.

The parameters $A_0$-$A_n$ can determine a relation function, e.g., the polynomial equation $$T(C) \approx \sum_{k=0}^{n} A_k \times C^k,$$

between a time value for each time point $T_1$-$T_m$ and a corresponding counter value of the counter values $C_1$-$C_m$. Thus, the MCU 120 can determine/calculate an estimated time value T' based on the parameters $A_0$-$A_n$ and a present counter value C' from the counter 116, e.g., $$T' = \sum_{k=0}^{n} A_k \times C'^k.$$

In one embodiment, the parameters $A_0$-$A_n$ are calculated when the GPS receiver 100 is going to be powered off, and are stored into the memory 126 before the GPS receiver 100 is powered off. When the GPS receiver 100 is powered off, the counter 116 continues operating and generating counter values $C_{m+1}$, $C_{m+2}$, ... $C_p$. Advantageously, when the GPS receiver 100 is re-powered on, the MCU 120 can access the parameters $A_0$-$A_n$ from the memory 126 and calculate an estimated time value T' based on a present counter value C' (C'=$C_{p+1}$, or $C_{p+2}$, ... ) according to equation (3).

$$T' = \sum_{k=0}^{n} A_k \times C'^k = A_0 + A_1 \times C' + A_2 \times C'^2 \ldots + A_n \times C'^n. \quad (3)$$

In another embodiment, the parameters $A_0$-$A_n$ are calculated during an initiation process when the GPS receiver 100 is re-powered on. For example, when the GPS receiver 100 is re-powered on, the MCU 120 accesses the data pairs ($T_i$, $C_i$) from the memory 126, and calculates the parameters $A_0$-$A_n$ based on the data pairs ($T_i$, $C_i$), and then calculates an estimated time value T' based on the parameters $A_0$-$A_n$ and a present counter value C' (C'=$C_{p+1}$, or $C_{p+2}$, ... ).

If the integer n is large enough, the error of the estimated time value T' can be less than a predetermine time interval (e.g., a half of a code period of a GPS L1 C/A code, e.g., 0.5 ms). Thus, the MCU 120 can determine a boundary of a navigation data bit in the present GPS signal based on the estimated time value T'. In other words, when the GPS receiver 100 is re-powered on, the system module 102 can acquire the present GPS signal received by the signal receiver 134 properly based on the parameters $A_0$-$A_n$ and the present counter value C'.

By calculating the estimated time value T, the GPS receiver 100 may not need to perform the lengthy conventional GPS bit synchronization process to determine the navigation data bit boundaries in the GPS signal. Consequently, the TTFF of the GPS receiver 100 can decrease. In addition, a low cost crystal oscillator (e.g., a 32.768K crystal) can be implemented as the clock signal generator 114, so as to reduce the cost of the GPS receiver 100.

Figure 2:
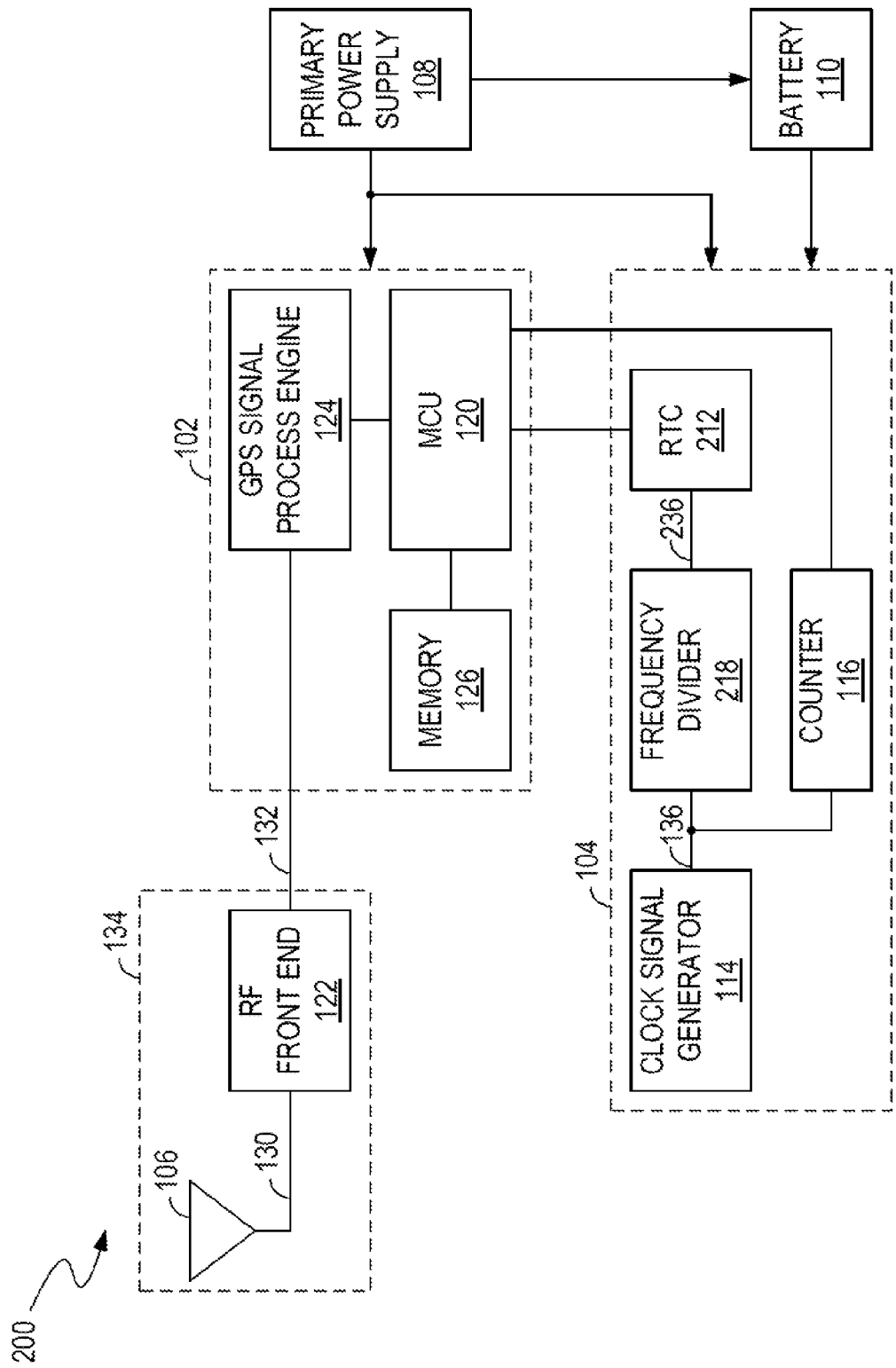
FIG. 2 depicts a block diagram example of a signal acquisition system, in accordance with one embodiment of the present invention.

FIG. 2 depicts another block diagram example of a signal acquisition system 200, in accordance with one embodiment of the present invention. Elements labeled the same as in FIG. 1 have similar functions. In the example of FIG. 2, the clock module 104 also includes a real time clock (RTC) 212 coupled to the MCU 120. The RTC 212 can provide a local time which includes the information of year, month, day, hour, minute, and second. In one embodiment, the RTC 212 is driven by the clock signal generator 114. A frequency divider 218 coupled between the clock signal generator 114 and the RTC 212 is capable of frequency-dividing the clock signal 136, such that the RTC 212 is driven by a pulse signal 236 having a proper frequency. In another embodiment, the RTC 212 is driven by a separate clock signal generator (not shown in FIG. 2).

In one embodiment, the GPS time information is written into the memory of the RTC 212. The RTC 212 can be coupled to a display system (not shown in FIG. 1) for showing a local time to a user. In addition, the RTC 212 can be used to determine whether the counter values are correct. For example, the RTC 212 can count for a predetermined time period. If an increment of the counter value exceeds a desired/predetermined range when the predetermined time period expires, it can indicate there may be an error in the counter value or the counter value may have exceeded a maximum counter value. Furthermore, when the GPS receiver 100 is re-powered on after being powered off for a time interval, the local time generated by the RTC 212 can be used for the satellite acquisition process, e.g., to estimate which satellites are available in the visible range of the GPS receiver 100.

Figure 3:
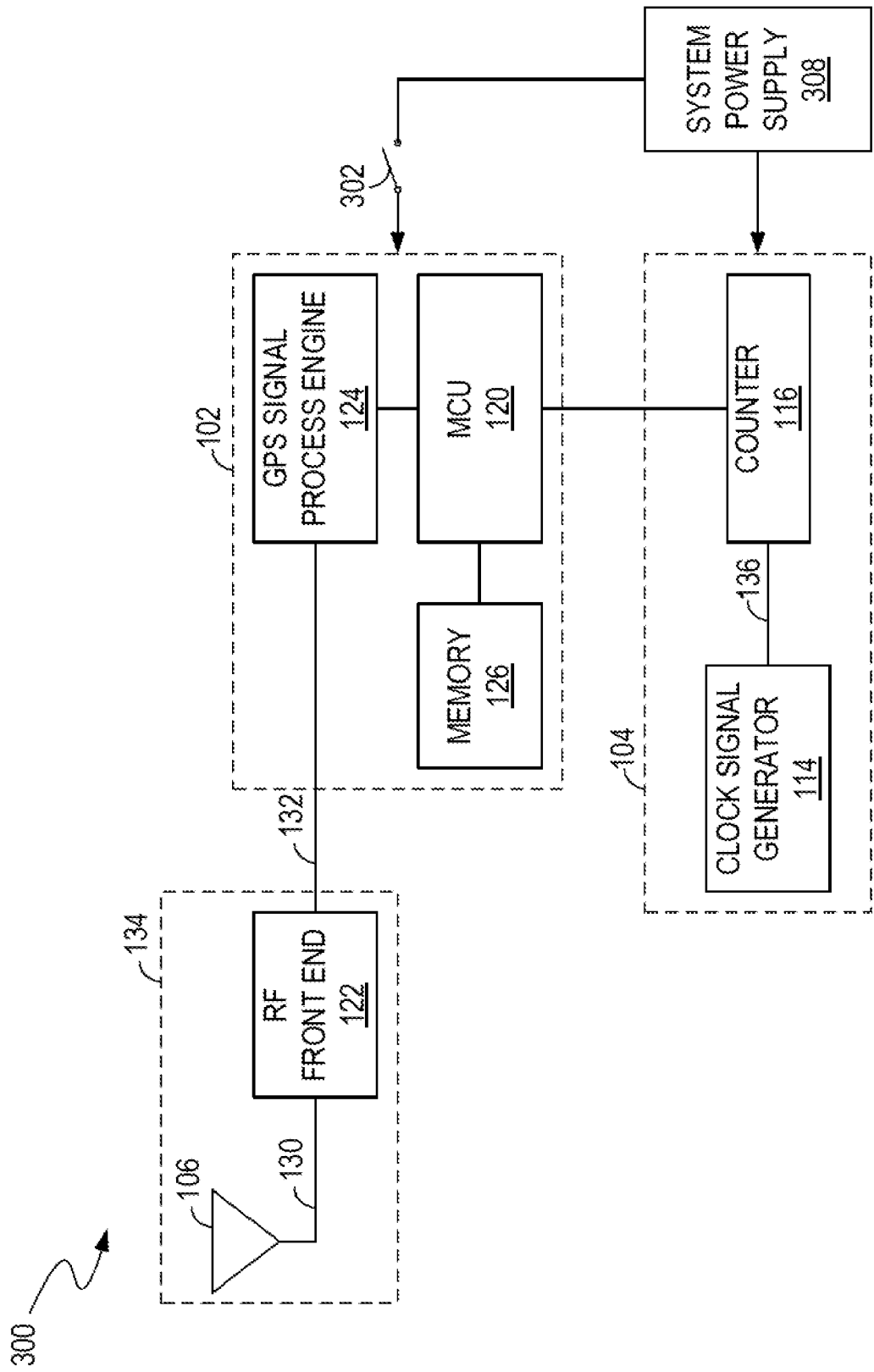
FIG. 3 depicts a block diagram example of a signal acquisition system, in accordance with one embodiment of the present invention.

FIG. 3 depicts another block diagram example of a signal acquisition system 300, in accordance with one embodiment of the present invention. Elements labeled the same as in FIG. 1 have similar functions. In the example of FIG. 3, a system power supply 308 can be coupled to the clock module 104 directly, and coupled to the system module 102 via a switch 302. When the switch 302 is turned on, the whole GPS receiver 100 is powered by the system power supply 308. When the switch 302 is turned off, the system module 102 is powered off, and in the mean time the clock module 104 is powered by the system power supply 308 and continues to operate. In this embodiment, the battery 110 (shown in FIG. 1) can be omitted.

Figure 4:
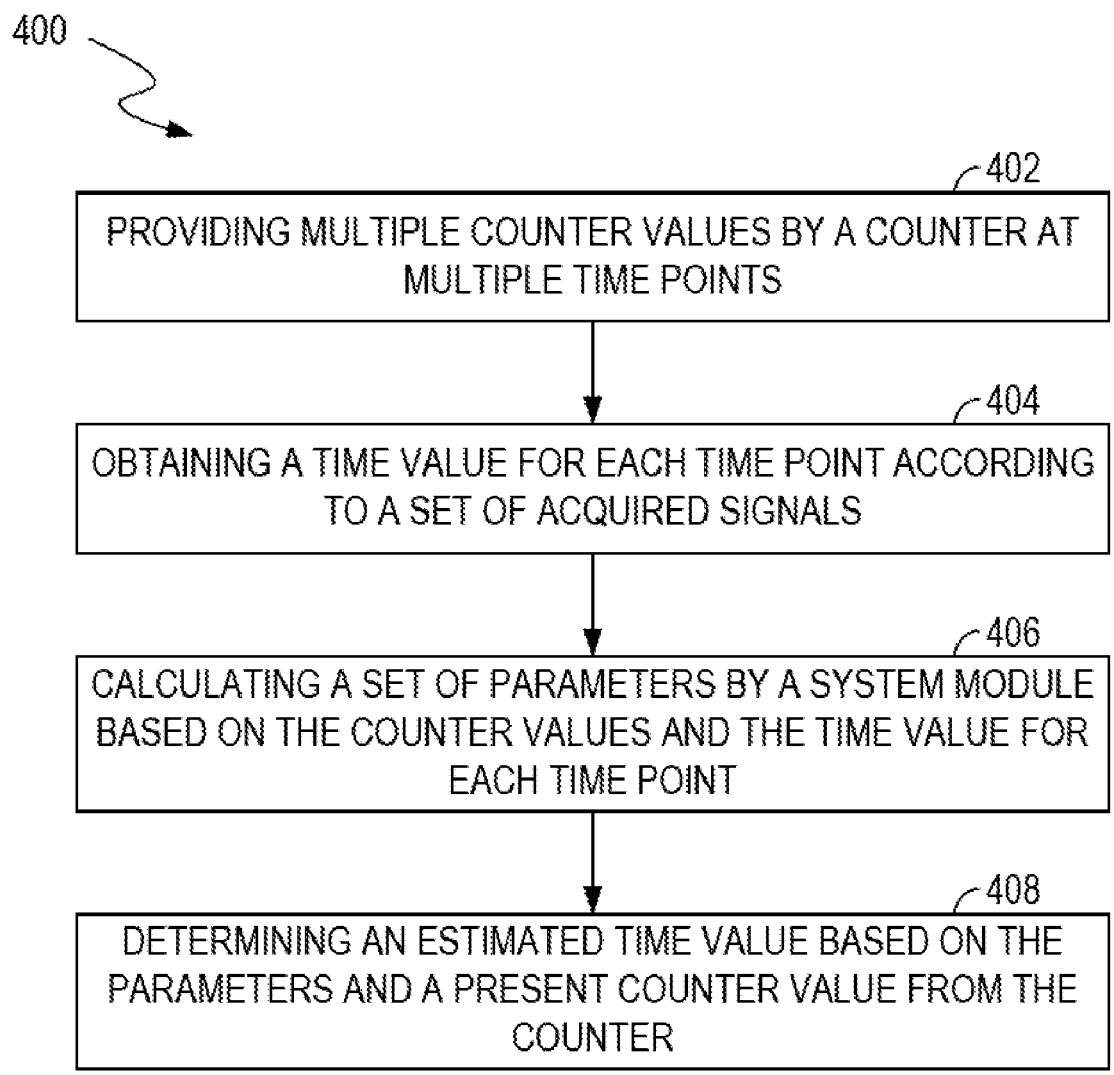
FIG. 4 depicts a flowchart example of operations performed by a signal acquisition system, in accordance with one embodiment of the present invention.

FIG. 4 depicts a flowchart example 400 of operations performed by a signal acquisition system, in accordance with one embodiment of the present invention. FIG. 4 is described in combination with FIG. 1, FIG. 2 and FIG. 3.

In block 402, the counter 116 provides multiple counter values $C_1$-$C_{n+1}$ at multiple time points $T_1$-$T_{n+1}$. In block 404, the system module 102 obtains a time value for each time point of the time points $T_1$-$T_m$ according to a set of acquired signals, e.g., GPS signals received by the signal receiver 134. For example, the GPS signal process engine 124 demodulates the GPS signals into navigation messages, such that the MCU 120 calculates time values of the time points $T_1$-$T_{n+1}$ according to the navigation messages.

In block 406, the MCU 406 also calculates a set of parameters $A_0$-$A_n$ based on the counter values $C_1$-$C_{n+1}$ and the time value for each time point $T_1$-$T_{n+1}$. When the GPS receiver 100 is re-powered on after being powered off for a time interval, the system module 102 can determine an estimated time value T' based on the parameters $A_0$-$A_n$ and a present counter value C' from the counter 116, as described in block 408. As a result, the MCU 120 can re-acquire GPS signals based on the estimated time value T'.

Accordingly, the present invention provides a signal acquisition system (e.g., a GPS receiver) with application of a counter. The counter can provide counter values for calculating an estimated time value. The GPS receiver can acquire, track and demodulate the GPS signals based on the estimated time value. The present invention also provides an exemplary method to determine a relationship between the GPS time and the counter value, which can be used to obtain the estimated time value. Such signal acquisition system can be used in many applications, e.g., GPS receivers, portable navigation devices, mobile phones, etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A signal acquisition system comprising:
   a clock module for providing a plurality of counter values at a plurality of time points; and
   a system module coupled to said clock module, and said system module being capable of
      obtaining a plurality of time values for said time points according to a plurality of signals from a signal source,
      establishing each equation of a plurality of equations using a respective time value of said time values and a respective counter value of said counter values,
      calculating a plurality of parameters based on said equations, and
      determining an estimated time value using said parameters and a present counter value from said clock module.

2. The signal acquisition system as claimed in claim 1, wherein said signal source comprises at least one satellite.

3. The signal acquisition system as claimed in claim 1, wherein said plurality of signals comprise a global positioning system (GPS) signal.

4. The signal acquisition system as claimed in claim 1, wherein said system module comprises a control unit for calculating a time value of said time values according to a navigation message.

5. The signal acquisition system as claimed in claim 4, wherein said system module further comprises a signal process engine for demodulating a global positioning system (GPS) signal into said navigation message.

6. The signal acquisition system as claimed in claim 1, wherein said parameters determine a relation function between a time value of said time values and a corresponding counter value of said counter values.

7. The signal acquisition system as claimed in claim 6, wherein said relation function is a polynomial equation $$T(C) = \sum_{k=0}^{n} A_k \times C^k,$$

wherein C represents a counter value provided by said clock module at a selected time point, T(C) represents a time value for said selected time point, $A_K$ represents a parameter of said parameters, and n represents a finite positive integer.

8. The signal acquisition system as claimed in claim 1, wherein said system module comprises a control unit or determining a boundary of a data bit in a present signal based on said estimated time value.

9. A method for acquiring a present signal comprising:
   providing a plurality of counter values by a counter at a plurality of time points;
   obtaining a plurality of time values for said time points according to a plurality of acquired signals;
   establishing each equation of a plurality of equations using a respective time value of said time values and a respective counter value of said counter values;
   calculating a plurality of parameters by a system module based on said equations; and
   determining an estimated time value using said parameters and a present counter value from said counter.

10. The method as claimed in claim 9, further comprising:
    demodulating a global positioning system (GPS) signal into a navigation message; and
    calculating a time value of said time values according to said navigation message.

11. The method as claimed in claim 9, further comprising:
    determining a relation function between a time value of said time values and a corresponding counter value of said counter values by said parameters.

12. The method as claimed in claim 9, wherein said present signal is a global positioning system (GPS) signal.

13. The method as claimed in claim 9, further comprising:
    determining a boundary of a data bit in said present signal based on said estimated time value.

14. A signal acquisition system comprising:
    a signal receiver for receiving a plurality of signals;
    a system module coupled to said signal receiver, said system module being capable of
       obtaining a plurality of time values based on said plurality of signals,
       establishing each equation of a plurality of equations using a respective time value of said time values and a respective counter value of a plurality of counter values associated with said time values,
       calculating a plurality of parameters based on said equations, and
       acquiring a present signal received by said signal receiver based on said parameters and a present counter value; and
    a counter coupled to said system module and for providing said plurality of counter values and said present counter value.

15. The signal acquisition system as claimed in claim 14, wherein said system module comprises a control unit for calculating a time value of said time values according to a navigation message.

16. The signal acquisition system as claimed in claim 15, wherein said system module further comprises a signal process engine for demodulating a global positioning system (GPS) signal into said navigation message.

17. The signal acquisition system as claimed in claim 14, wherein said parameters determine a relation function between a counter value of said counter values and a corresponding time value of said time values.

18. The signal acquisition system as claimed in claim 17, wherein said relation function is a polynomial equation $$T(C) = \sum_{k=0}^{n} A_k \times C^k,$$

wherein C represents a counter value provided by said clock module at a selected time point, T(C) represents a time value for said selected time point, $A_K$ represents a parameter of said parameters, and n represents a finite positive integer.

19. The signal acquisition system as claimed in claim 14, wherein said present signal is a global positioning system (GPS) signal.

20. The signal acquisition system as claimed in claim 14, wherein said system module comprises a control unit for calculating an estimated time value according to said parameters and said present counter value.

21. The signal acquisition system as claimed in claim 20, wherein said system module determines a boundary of a data bit in said present signal based on said estimated time value.

22. The signal acquisition system as claimed in claim 7, wherein said system module is capable of reducing error in said estimated time value by increasing said finite positive integer in said polynomial equation.

* * * * *